Lounsbury & Willson,
Horse Rake.

No. 27,009.

Patented Jan. 31, 1860

Witness hereto.

Rodolphus Lounsbury
Francis Willson

UNITED STATES PATENT OFFICE.

R. LOUNSBURY, OF FULTON, AND F. G. WILLSON, OF ONTARIO, CANADA.

IMPROVEMENT IN HORSE-RAKES.

Specification forming part of Letters Patent No. 27,000, dated January 31, 1860.

*To all whom it may concern:*

Be it known that we, RODOLPHUS LOUNSBURY, of the village of Fulton, in the county of Lincoln, and FRANCIS G. WILLSON, of the village of Ontario, in the county of Wentworth, all of the Province of Canada, have jointly invented a new Horse-Rake; and we do hereby declare that the following is a full and exact description thereof, reference being had to the accompanying drawings, and to the letters of reference marked thereon.

Figure 1:
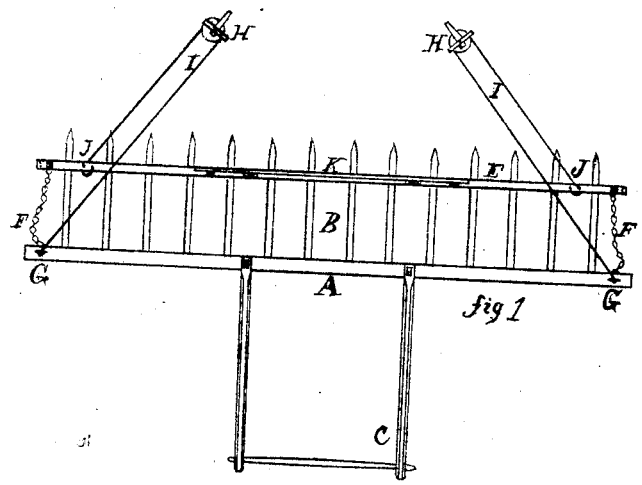
Figure 2:
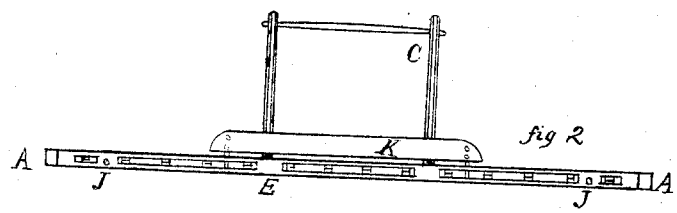
Figure 3:
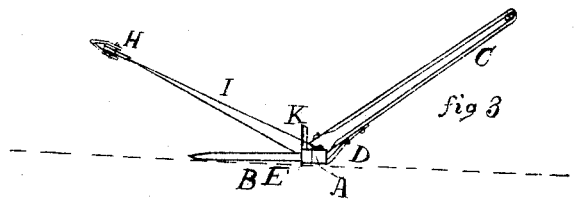

Figure 1 represents the ground plan; Fig. 2, the front elevation; Fig. 3, the end elevation.

The same letters indicate corresponding parts in all the figures.

A is the head of the rake; B, the teeth; C, the handles bolted firmly to the head and braced by a strong iron brace, D, under each.

E is the slide or stripper, composed of an inch batten above and another below the teeth, with six blocks between, four of which are bolted through to hold it together. This slide moves freely from head to point of the teeth. It has a small chain, F, at each end, which two of the bolts go through, while the other end of the chains are held to the head by the leg of the staples G. These chains merely prevent the slide flying off the teeth.

H H are two light pulleys, into which the traces of the horse are hooked. The ropes I I pass through the pulleys, one end being knotted through the block of the slide at J, the other end through the staple in the head at G.

K is a board attached to two studs, which drop into holes in the slide, which is sometimes used to prevent the hay coming over the rake.

The dotted line in Fig. 3 shows the ground-line and the position in which the rake runs along it.

The position of the slide E, Fig. 3, against the head A, shows the rake in a position for loading hay, straw, &c. It is unloaded by simply holding back or pulling suddenly on the handles while the horse is traveling forward, which causes the ropes to render through the pulleys moving the slide forward and throwing off the load. At the same time the draft brings the teeth in a line with the pulleys and handles, and lifts the rake over the windrow. By pushing suddenly forward on the handles when the rake is on the top of the windrow the teeth protrude through the slide, the hay and stubble driving it back against the head again, when it soon becomes loaded, as before, so that loading or unloading is performed by simply moving the handles backward or forward, and enables one person to hold and drive with ease and facility, the whole machine being light and simple, weighing only between forty and fifty pounds.

What we claim as our invention, and desire to secure by Letters Patent, is—

The arrangement of the head A, chains F F, slide-board K, teeth B, ropes I I, with knotted ends J, and pulleys H H, the whole being constructed for conjoint operation in the manner and for the purpose herein described.

Witness our hands at Ontario the 18th day of December, A. D. 1858.

RODOLPHUS LOUNSBURY.
FRANCIS G. WILLSON.

Witnesses:
B. E. NELLES,
I. W. WILLSON.